This invention relates to friction facings and is particularly directed to friction facings used in multiple plate energy transmitting devices.

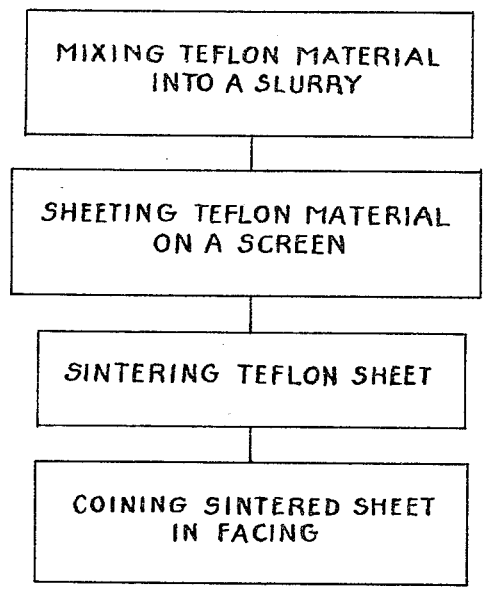
HOWARD W. CHRISTENSON
ROBERT H. SCHAEFER
INVENTORS
THEIR ATTORNEY 3,320,107
METHOD OF MAKING A FACING FOR USE IN
ENERGY TRANSMITTING DEVICE
Howard W. Christenson, Indianapolis, and Robert H. Schaefer, Westfield, Ind., assignors to General Motors Corporation, Detroit, Mich., a corporation of Delaware
Filed Jan. 30, 1963, Ser. No. 255,063
4 Claims. (Cl. 156—89)

It is an object of the invention to provide a facing for a plate for use in an energy transmitting device wherein the facing is heat resistant, has a coefficient of static friction which approximates its coefficient of dynamic friction whereby the capacity of the energy transmitting device utilizing the device is greatly improved.

A further object of the invention is to provide a clutch facing material for use in automatic transmissions and the like wherein the facing consists essentially of Teflon material in felted, sintered and coined condition.

In carrying out the above objects, a further object is to provide a facing wherein a fiber is used in combination with the Teflon, which fiber is present in percentages of less than 50% of the total weight of the facing.

A further object of the invention is to provide a facing for use in automatic transmission clutch applications wherein the facing is resistant to high temperatures at the operating surface and wherein the facing is better wearing and less subject to seizing under extreme conditions than facings now available.

A still further object of the invention is to provide facing material for an automatic clutch wherein lubrication requirements are minimized due to the inherent surface condition of the facing.

Further objects and advantages of the present invention will be apparent from the following description, reference being had to the accompanying flow chart which shows the preferred procedural steps in making a facing described herein.

Energy transmitting devices such as automatic transmissions utilizing a plurality of aligned friction plates are well known. These devices include a plurality of alternate plates which are driven and driving in nature so that, upon applying axial pressure, the plates rotate as a unit to provide torque transmission from an engine to the wheels of a vehicle, for example. There has been a constant search for facing materials for use in such a clutch pack which offer the wide range of characteristics necessary for proper operation and long life of the device.

A typical automatic transmission is clearly shown in the Thompson United States Patent No. 2,357,295. Subsequent improvements embrace facings on the plates of a porous nature, such as paper, wherein fibrous material, such as cellulose fibers and the like, are impregnated with phenolic resins and bonded to the clutch plates. These facings improved the operation of the transmission by making the same smoother and, in general, made the entire device commercially practical. Millions of such transmissions utilizing facings of this character are presently in use in vehicles throughout the world.

Subsequent improvements in the configuration and relation of the plates have been made to obtain specific operational characteristics. One such improvement is shown in the Sand Patent No. 2,927,673 wherein a specific disposition of the waved plates normally used in these transmissions is provided for improving the operation of the device. In this patent mention is made of sintered metal facings which have been used for heavy-duty operations. Also in the Sand patent, a showing is made of facings having various types of grooving in the surface of the facings. These grooves are used to modify the characteristics of the clutch by permitting the transmission fluid to escape more readily from between the plates, while simultaneously cooling the plates by passing through the grooves therein. Such configurations may be applied to any type of clutch plate facings, whether metallic or non-metallic.

While the transmissions of the prior art, as exemplified in the foregoing patents, have been tremendously successful in pleasure vehicles and in bus and some truck applications, the facings have not been completely satisfactory in some instances for long service in extremely heavy-duty applications with full efficiency, such as off-road machinery and the like. In these instances, the non-metallic facings tend to char while the metallic facings are rough in their operation, and in some cases of extreme load, have been known to fuse superficially due to extreme temperatures. Furthermore, most of the facings known heretofore vary in their frictional coefficients from static to dynamic conditions and these variations are amplified by carbonization of transmission oil on the surface of the facings which may create undesirable operational conditions.

The present invention is directed to a facing material for energy transmitting devices which eliminates many of these past difficulties and which is entirely satisfactory for use in all types of transmissions, although particularly applicable for heavy-duty work since the many disadvantages of prior facings are substantially overcome.

The facing material of this invention is specifically a polytetrafluoroethylene (Teflon) paper or mat made from polytetrafluoroethylene material felted and sintered and finally coined to produce a high density though somewhat porous material. One problem with a polytetrafluoroethylene facing, as described herein, is the bonding of such a facing to a metallic supporting plate and the technique for accomplishing this is described in detail in co-pending application Ser. No. 255,072 filed concurrently herewith and assigned to the assignee of the present invention.

The polytetrafluoroethylene facing which forms the subject of this invention may be formed from pure Teflon or from mixtures of Teflon with filler materials of a non-metallic nature and ceramic in character. For example, aluminum silicate fibers, glass fibers and various types of asbestos fibers and synthetic fibers such as "Fiberfax," which is produced from molten mixtures of alumina and silica, may be used to advantage. Also, powdered alumina, powdered silica, etc. may be used as fillers in part, although, in most instances, we prefer fibrous materials since the materials felt or mat better and produce a more homogeneous facing with the polytetrafluoroethylene. In general, the ceramic fibers should not be over about one-fourth inch in length and preferably in the order of about one-eighth inch to one-fourth inch, whereas the Teflon is a standard commercial material either conventional or of a low molecular weight type preferably capable of passing a 325 mesh screen and usually in the order of .2–.5 micron in diameter. One of such materials is designated as Du Pont Teflon 41BX (low density type). In general, the low molecular weight type is preferred. The polytetrafluoroethylene material should make up at least 50% by weight of the total mat or facing and preferably should be used in quantities of about 60% with the ceramic material making up about 40%. In forming the mat or facing, the polytetrafluoroethylene and the ceramic fibrous material, in desired proportions, are mixed in water with a wetting agent to form a readily flowable slurry. This slurry is felted out on a screen or the mat may be made continuously on a Fourdrinier paper making machine by following conventional paper making techniques. The thickness of the felted layer may be controlled by well known procedures.

A specific example of making such a sheet is as follows: 100 parts by weight of Teflon solids, designated as Du Pont 41BX, is mixed with a suitable amount of a wetting agent, for example, Triton X–100 (alkyl aryl polyether alcohol) in water sufficient to form a slurry. To this is added about a one percent concentration of aluminum sulfate to control pH. Thereafter, a stabilizer, such as Duponol ME (sodium salt of lauryl alcohol sulfate) dissolved in water is mixed with the slurry. Sufficient water should be present to maintain the solids content in the order of from one percent to two percent of the slurry. During the final mixing, the concentration of alum should be maintained at about 0.4%. Thereafter, the fibers are matted on a screen to the desired thickness, in this instance, about 60 mils. The mat is removed from the screen on aluminum foil and is dried at 250° F. to a constant weight.

It is understood that other wetting agents and stabilizers may be used as is conventional in the art of paper making. Further, the alum content may be varied to obtain satisfactory results.

After the mat is produced, it is sintered without pressure at temperatures in the order of 680° to 710° F. for periods ranging from 1½ to 2½ hours, and preferably about two hours at 690° F. This causes the Teflon to fuse together at contacting portions and form a strong porous network or mat in which the ceramic fibers are occluded and contained. While still hot, this mat is next placed on a heated platen and is coined to the exact thickness and shape desired. The coining operation is accomplished at temperatures preferably ranging between 325° to 375° F. and the pressure applied varies from 900 to 1200 lbs. per square inch, with 1,000 lbs. per square inch being preferred. It is understood that the pressure may be varied to obtain materials of the desired physical characteristics, such as compressibility. In this connection, the compressibility of the facing made under the preferred conditions is in the order of 15% at 5000 lbs. per square inch pressure indicating a degree of porosity within the facing. It is understood, however, that the compressibility factor of a facing will vary inversely with the percentage of Teflon. The pressure will also vary according to composition to obtain the optimum results. This hot coining operation consolidates the sintered mat into a sheet having good strength. During the coining operation surface configurations may be embossed into the mat such as groves, etc., if desired. The facing is now ready for attaching to a metal-carrying disk under the teachings of the aforementioned copending application.

Teflon facings of the type described have very soft shifting qualities without seizure under extreme operating conditions. The coefficient of friction of the facings under static conditions approaches the coefficient of friction under dynamic conditions which decreases shock during plate engagement. Carbonized oil will not adhere to the facings, so that the problems normally encountered in automatic transmissions due to carbonized oil glaze on the surface of the plates are not present on transmissions using the present plates. This eliminates the drift in the dynamic coefficient of friction so prevalent in heavy-duty applications with the usual type of clutch plates. It further elminates the possibility of seizing or welding of plates in high temperatures which is sometimes encountered when using metallic facings.

We have found that the polytetrafluoroethylene facings have a longer life than bronze facings and most certainly outlast nonmetallic facings of the cellulose base type. Furthermore, due to the inherent lubricating character of polytetrafluoroethylene, a lower flow of cooling oil is required to cushion and cool the plates which reduces the complexity of the cooling system presently used in automatic transmissions, and similarly reduces friction losses.

Another basic improvement in the combination results from the lower temperatures required to bond the Teflon facings to the steel backing plates over metallic facing materials. If the metallic facing is bonded directly to the steel, the bonding temperature approaches the draw temperature of the steel core whereby the hardness tends to be reduced which increases wear at the spline. The bonding temperatures for Teffon facings are much lower and do not present these problems. Since the polytetraflueroethylene material resists adhesion of foreign substances, the coefficient of friction of the plate remains substantially constant throughout its wear life.

In general, comparative tests under identical operating conditions using sintered metal and Teflon faced plates have shown the latter to be superior in all phases of operation to the metallic plates, whereby the energy transmitting device, including the plates as functional components, offers improved operational characteristics under conditions of heavy load surpassing anything heretofore obtained.

While the embodiments of the present invention as herein disclosed constitute preferred forms, it is to be understood that other forms might be adopted.

What is claimed is as follows:

1. A method of making a facing for use in an energy transmitting device consisting essentially of felting nonmetallic fibrous material including at least 50% by weight of polytetrafluoroethylene fibers into a sheet, sintering the sheeted fibers for causing the polytetrafluoroethylene fibers to fuse together at their contacting portions and coining the resulting sheet under an elevated temperature and pressure for consolidating the sheet into a strong facing material.

2. A method of making a facing for use in an energy transmitting device consisting essentially of felting nonmetallic fibrous material including an intimate mixture of at least 50% by weight of polytetrafluoroethylene fibers and the remainder ceramic fibers into a sheet, sintering the sheeted fibers for causing the polytetrafluoroethylene fibers to fuse together at their contacting portions occluding the ceramic fibers and coining the resulting sheet under an elevated temperature and pressure for consolidating the sheet into a strong facing material.

3. A method of making a facing for use in an energy transmitting device consisting essentially of mixing nonmetallic fibrous material including an intimate mixture of at least 50% by weight of polytetrafluoroethylene fibers and the remainder ceramic fibers with water to form a slurry, felting the fibers from the slurry into a sheet, sintering the sheeted fibers for causing the polytetrafluoroethylene fibers to fuse together at their contacting portions occluding the ceramic fibers and coining the resulting sheet under an elevated temperature and pressure for consolidating the sheet into a strong facing material.

4. A method of making sheet stock for use as a facing in an energy transmitting device consisting essentially of dispersing non-metallic fibrous material including an intimate mixture of at least 50% by weight of polytetrafluoroethylene fibers and the remainder ceramic fibers in water, agitating the dispersion to form a slurry of the fibers suspended in the water, removing the water from the slurry to felt out the fibers in a sheet of the desired thickness, sintering the sheet at temperatures of 700° F. ±20° F. for about two hours to cause the polytetrafluoroethylene fibers to fuse together at their contacting portions occluding the ceramic fibers and forming a strong porous sheet, and coining the hot sheet under substantial pressures between platens maintained at temperatures above 300° F. for consolidating the sheet into a strong substantially nonporous facing material.

(References on following page)

References Cited by the Examiner

UNITED STATES PATENTS

| | | | |
|---|---|---|---|
| 2,652,878 | 9/1953 | Gerard | 156—209 |
| 2,689,805 | 9/1954 | Croze et al. | 117—65 |
| 2,691,814 | 10/1954 | Tait | 29—182.5 |
| 2,887,526 | 5/1959 | Rudner | 174—152 |
| 2,971,877 | 2/1961 | Arledter | 162—157 X |
| 2,976,093 | 3/1961 | Reiling | 308—238 |
| 3,097,991 | 7/1963 | Miller et al. | 162—157 |
| 3,141,814 | 7/1964 | Schultz | 162—157 |
| 8,186,897 | 6/1965 | Hochberg | 162—157 X |

EARL M. BERGERT, *Primary Examiner.*

HAROLD ANSHER, *Examiner.*